LE ROY R. HESS & A. S. BURDICK.
VEHICLE TIRE.
APPLICATION FILED OCT. 5, 1910.
1,032,544.
Patented July 16, 1912.
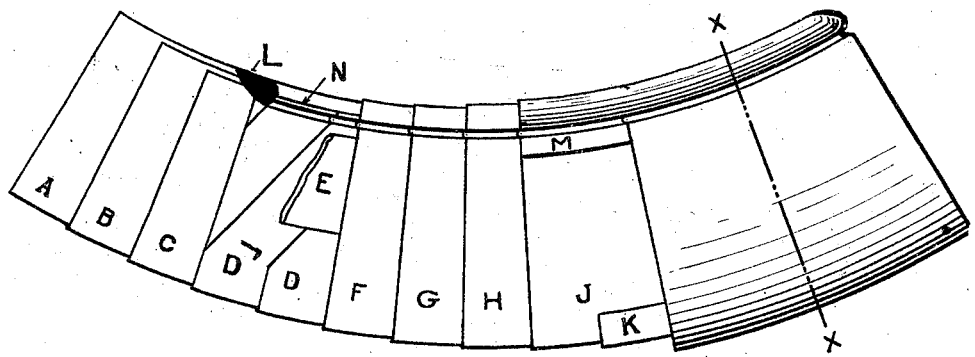
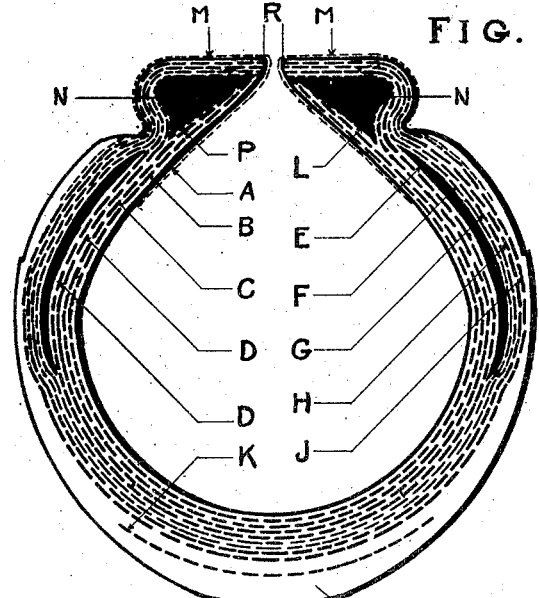
FIG. 2    SECTION-X-X-
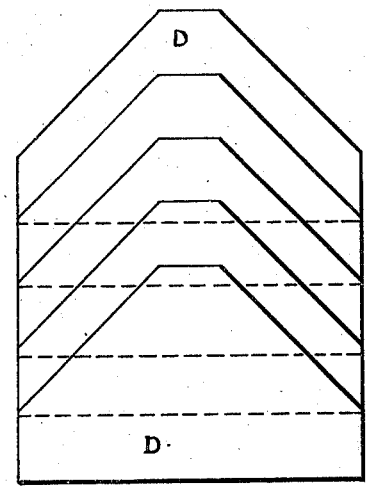
FIG. 3
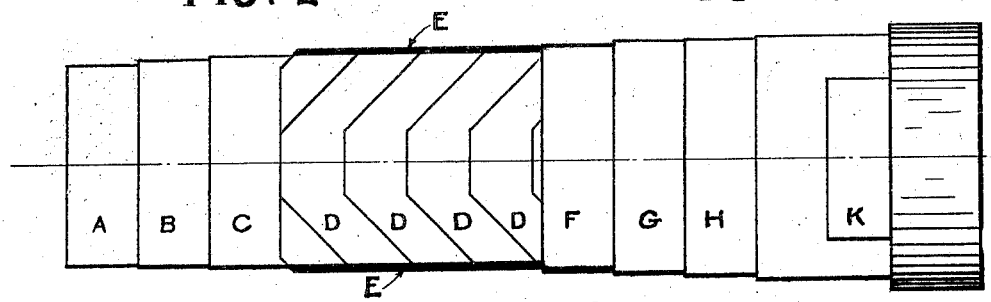
FIG. 4
WITNESSES.
INVENTORS

UNITED STATES PATENT OFFICE.

LE ROY R. HESS, OF JOLIET, AND ADELBERT S. BURDICK, OF LOCKPORT, ILLINOIS, ASSIGNORS TO SAMUEL J. DREW, OF JOLIET, ILLINOIS.

VEHICLE-TIRE.

1,032,544.        Specification of Letters Patent.      Patented July 16, 1912.

Application filed October 5, 1910. Serial No. 585,500.

*To all whom it may concern:*

Be it known that we, LE ROY R. HESS and ADELBERT S. BURDICK, citizens of the United States, and residing, respectively, in Joliet, county of Will, and State of Illinois, and in Lockport, in the county of Will and State of Illinois, have invented a new and useful Vehicle-Tire, of which the following is a specification.

Our invention relates more particularly to pneumatic tires and the principal object is to provide a comparatively simple, inexpensive, and reliable tire structure wherein the liability of bursting, blow-outs, punctures, etc., shall be practically eliminated.

More specifically stated, our invention comprehends a tire casing constituted of a plurality of superposed layers of textile fabric and other materials of novel structure and arrangement.

Other objects, as well as the nature, characteristic features, and scope of the invention will more readily be understood from the following description taken in connection with the accompanying drawing, forming a part hereof, wherein,—

Figure 1, is a side view of a tire casing constructed in accordance with our invention, partly cut away to more clearly illustrate the general arrangement and relation of the various components. Fig. 2, is a section on line x—x of Fig. 1. Fig. 3, is a detail, illustrating the shapes of some of the layers; and, Fig. 4, is a view from the tread side, with part of the tread cut away to show the overlapping sections.

In the practice of the invention, we prepare, obviously on a suitable block or form, an inner wall or foundation made up of several layers of heavy or friction fabric, designated A, B, and C. The beads L, are then placed in position, Figs. 1 and 2, and the fabric layers A, B, and C, are covered by strips D, of fabric or other material each cut with a V shape end, and, as clearly shown in Fig. 3, these plies or strips D overlap one another like fish scales or like the shingles of a roof. Between each ply there is an intervening layer of cementing composition such as rubber stock. We then apply the longitudinally ranging elastic reinforcements E, which are preferably strips of gum rubber. The presence of these strips manifestly tends to increase the resiliency or elasticity of the casing. Subsequently the strips F, G, H, and J, of progressive widths of friction fabric, are laid as in Figs. 1, 2, and 3. We then apply a breaker-strip K, of fabric, which acts as a reinforcement for the tread. The beads are protected and additionally secured by strips or layers of suitable material N, P, and R, and the whole is bound together by a friction body M. Thereafter we prepare the last or finish rubber cover stock composed of two or any desired number of plies of rubber. The composite structure is then cured or vulcanized in the well known manner.

It will be obvious to those skilled in the art to which the invention relates that modifications may be made in details without departing from the spirit and scope of the invention. Hence the same is not limited other than required by the state of the prior art.

Having described the nature and objects of the invention what we claim as new and desire to secure by Letters Patent is;

A shoe for pneumatic tires comprising, an inner wall or base of friction material, and a built-up series of overlapping strips of fabric with V shape ends, united by strips of cementing material, suitable breaker and cushion reinforcements, complemental beads, and an outer layer of rubber stock, substantially as described.

In witness whereof we affix our signatures in presence of two witnesses.

LE ROY R. HESS.
ADELBERT S. BURDICK.

Witnesses:
SAMUEL J. DREW,
WILLIAM D. HALL.

---

Copies of this patent may be obtained for five cents each, by addressing the "Commissioner of Patents, Washington, D. C."